June 15, 1965 R. I. ROBINSON 3,188,833
ELECTRIC MOTOR WITH IMPROVED COOLING MEANS
Filed Nov. 23, 1959 2 Sheets-Sheet 1

Inventor
Russell I. Robinson
By Ira Milton Jones
Attorney

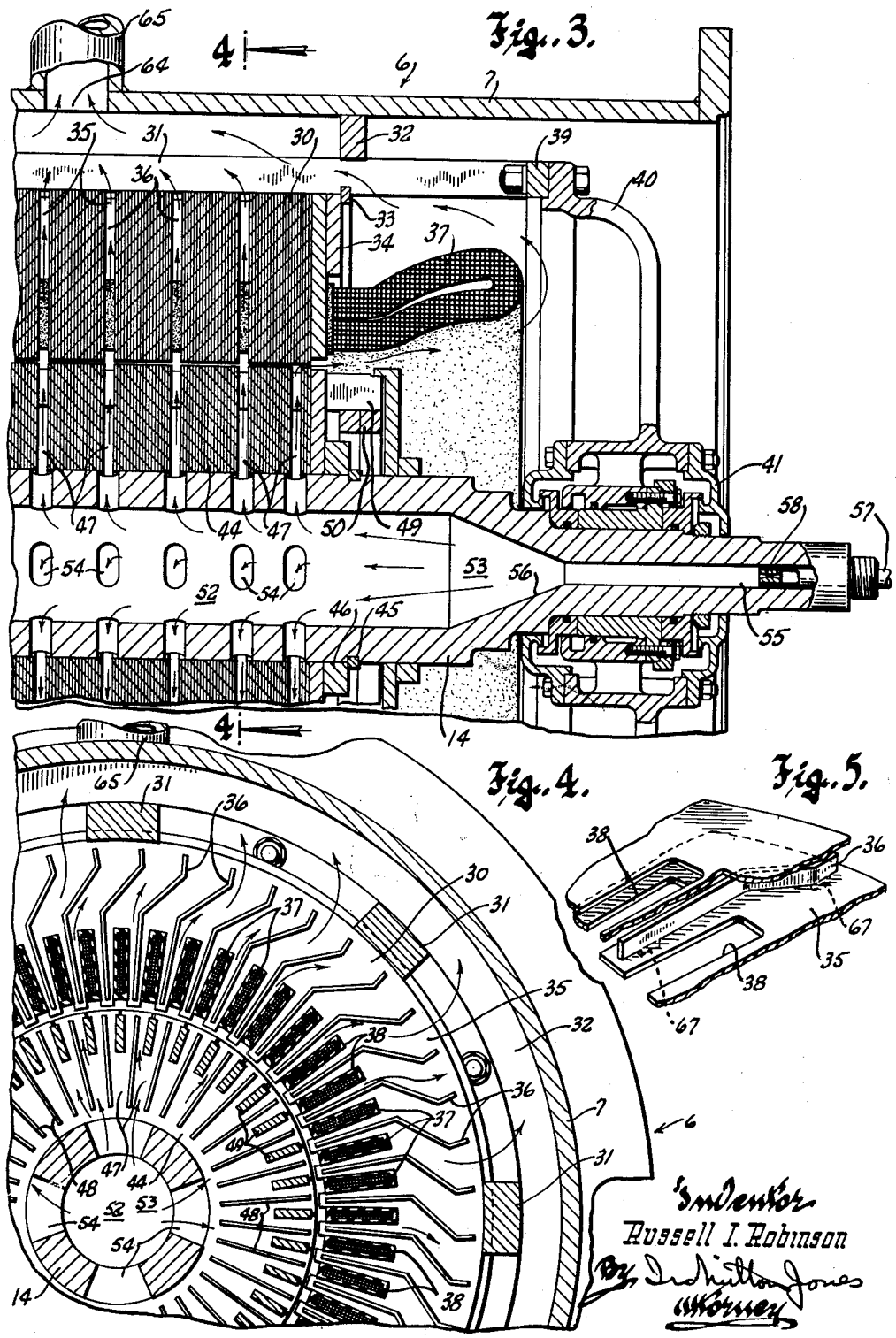

United States Patent Office 3,188,833
Patented June 15, 1965

3,188,833
ELECTRIC MOTOR WITH IMPROVED
COOLING MEANS
Russell I. Robinson, Thiensville, Wis., assignor to The Louis Allis Company, Milwaukee, Wis., a corporation of Wisconsin
Filed Nov. 23, 1959, Ser. No. 854,787
2 Claims. (Cl. 62—505)

This invention relates to improvements in dynamo-electric machines, and has as its purpose to improve the cooling of such machines and particularly to improve the cooling of totally enclosed large electric motors.

Many different schemes for cooling electric motors have been devised and tried in the past with varying degrees of success, but those heretofore proposed and available, for one reason or another, have not been too successful in large motors on the order of 600 H.P., especially where they are totally enclosed.

In contrast, the present invention presents a way of cooling electric motors which is entirely satisfactory, even under the most trying conditions. Its success lies in the fact that it employs a liquid cooling medium which is capable of flashing into a gas at a low pressure and the temperature which obtains inside the rotor; and in a structural arrangement of the motor parts which enables this cooling medium to be brought into the rotor interior as a liquid to be there suddenly converted into a gas and, in that state, conducted from the rotor and across the hottest parts of the machine.

More specifically, the invention turns upon the use of a liquid refrigerant, such as Freon, which is injected into an expansion chamber inside the rotor of the machine, where the elevated temperature immediately flashes the Freon into a gas and from which expansion chamber the gaseous refrigerant flows through passages in the rotor and stator in direct contact with the very source of heat, to abstract heat therefrom and carry it out of the motor rapidly and efficiently.

Although the invention contemplates the cooling of motors irrespective of the machines they drive—providing that a source of liquid refrigerant, such as Freon, is available—the invention is particularly adapted to the cooling of electric motors which drive the compressor or compressors of refrigerating systems, since, in this case, the very environment of the motor contributes to the adaptation of the invention.

It is, therefore, an object of this invention to combine an electric motor with a closed circuit refrigerating system in a way which achieves greatly improved cooling of the motor by diverting liquid refrigerant from the closed refrigerating system into the motor interior where it flashes into gas and, in this state, flows across the hottest parts of the machine to carry off heat and, in its heat laden condition, is returned to the closed refrigerating system.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 3 is a fragmentary longitudinal sectional view through a portion of the motor at a still larger scale to better illustrate the circulation of the cooling medium through the motor;

FIGURE 4 is a cross sectional view through FIGURE 3 on the plane of the line 4—4; and FIGURE 5 is a fragmentary perspective view of a portion of the stator laminations to illustrate particularly the manner in which radial passages are formed in the stator to accommodate the flow of the cooling medium therethrough.

Figure 1:
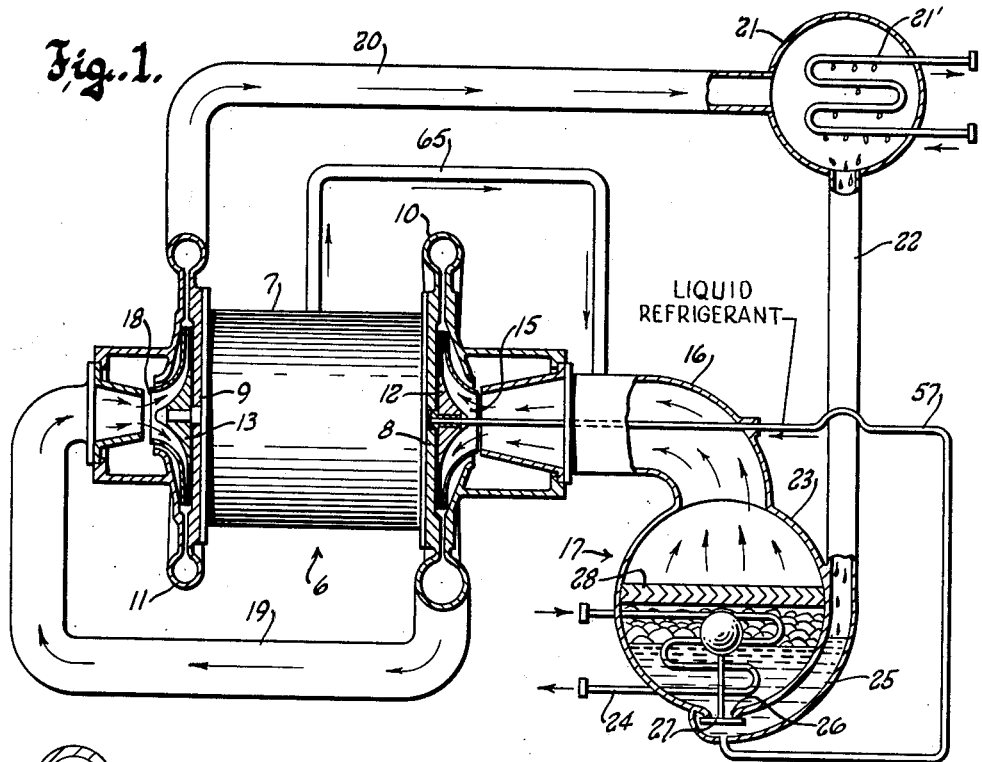
FIGURE 1 is a view of a refrigerating system equipped with the motor of this invention and illustrating the manner in which the cooling means for the motor is connected with the refrigerating system.
Figure 2:
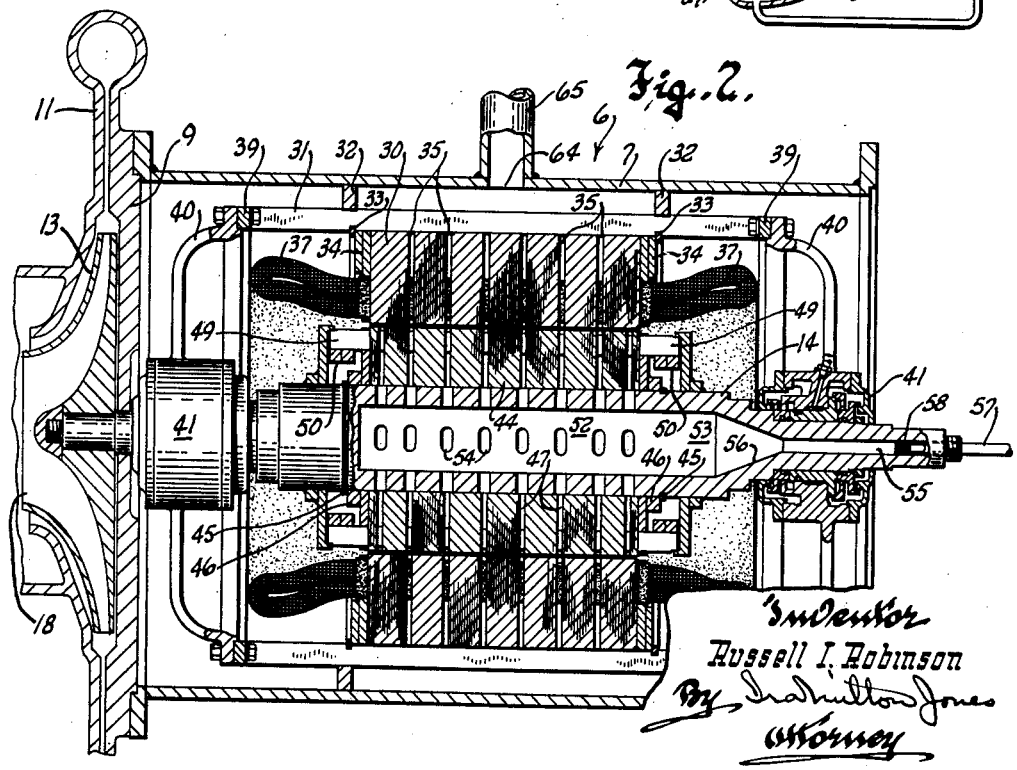
FIGURE 2 is an enlarged longitudinal sectional view through the motor.

Referring now particularly to the accompanying drawings, the numeral 6 designates generally an electric motor equipped with the cooling means of this invention, and serving as the power unit for the compressor of a refrigerating system. The motor is of the totally enclosed type and its housing, which comprises a cylindrical shell 7, and end walls 8 and 9 is so connected into the closed refrigerating system that running seals between rotating and stationary parts are entirely eliminated.

The end walls 8 and 9 of the motor housing are the housings of first and second stage centrifugal pumps 10 and 11, respectively. The impellers 12 and 13 of these two centrifugal pumps, are mounted directly upon the opposite ends of the motor shaft 14 and, of course, rotate within the pump housings 10 and 11.

The inlet 15 of the first stage compressor pump 10 has gaseous refrigerant fed thereto by a pipe 16 which leads from a heat exchanger 17, and the outlet of the first stage compressor pump is connected to the inlet 18 of the second stage compressor pump through a duct 19. After this two-stage compression of the gaseous refrigerant, it is discharged through a duct 20 into a condenser 21.

In the condenser, the compressed gaseous refrigerant is cooled and liquified as it passes over a condenser coil 21' through which cold water circulates. The liquid refrigerant then flows from the condenser through a duct 22 into the shell or casing 23 of the heat exchanger 17.

Since the refrigerant in the shell 23 of the heat exchanger 17 vaporizes as it serves its purpose of chilling the liquid heat exchange medium flowing through the coil 24 of the heat exchanger, means are provided to maintain a constant reservoir of liquid refrigerant in the shell 23. For this purpose, the duct 22 connects with the shell through a trap 25 which opens to the bottom of the shell through an inlet 26 controlled by a float responsive valve 27. The float controlled valve 27, which has been only diagrammatically illustrated, opens whenever the level of the liquid in the shell drops below a predetermined minimum, and hence maintains the liquid level in the shell 23 substantially constant.

The gaseous refrigerant which forms in the shell 23 of the heat exchanger 17 as a result of heat energy being abstracted from the liquid cooling medium flowing through the coil 24, is conducted from the heat exchanger 17 by the pipe 16, and a strainer 28 is preferably provided in the heat exchanger shell to guard against liquid refrigerant being carried up into the pipe 16.

The motor 6 has the customary laminated stator core 30 mounted in the housing or shell 7, but in a way which spaces the periphery of the core from the shell. To this end, the stator core is supported by a series of circumferentially spaced bars 31 and a pair of rings 32 connecting the bars with the shell 7. The bars 31 serve to hold the stator laminations together by having locking rings 33 seated therein and bearing against clamping rings 34 at the ends of the stack of laminations.

The laminations of the stator core are, however, divided into a plurality of axially spaced groups, the spaces therebetween providing radial passages 35 leading from the clearance between the rotor and stator core to the periphery of the stator core and hence to the space surrounding the stator core inside the shell 7. Spacers 36 (see FIGURE 5) secured to certain of the laminations, serve to space the groups of stator laminations from each other without obstructing the passages 35. These spacers are located between the adjacent field coils 37, which are laid in the coil slots 38 of the stator laminations, and, of course, span the passages 35 so that a cooling medium flowing through the passages wipes across the coils.

The ends of the bars 31 are connected by rings 39 which are welded or otherwise secured thereto, and these rings have bearing brackets 40 centered thereon and bolted thereto. The bearing brackets 40 carry suitably lubricated bearings 41 in which the opposite ends of the motor shaft 14 are journalled.

The shaft 14 has the rotor laminations 44 mounted thereon by being clamped between locking rings 45 which are seated in grooves in the shaft and bear against end clamping collars 46. The rotor laminations, like the stator laminations, are divided into axially spaced groups to provide radial passages 47, the spacing between adjacent groups being maintained by radially disposed spacers 48. These spacers are located between the winding bars 49 of the rotor, which occupy the slots therein and have their ends connected by end rings 50, in a manner enabling the ends of the bars to serve as fan blades.

Although the fan blades provided by the end portions of the conductor bars 49 effect circulation of the air within the motor enclosure, they have only a minor part in the cooling of the motor. This is done by feeding liquid refrigerant into an expansion chamber 52 inside the rotor where it flashes into a gas, and in that state leaves the expansion chamber through the radial passages 47 and 35.

The expansion chamber is formed by the interior of a hollow medial portion 53 of the shaft upon which the rotor core is mounted, and to enable the gaseous refrigerant to flow from the expansion chamber, the hollow shaft portion has ports 54 in line with the passages 47. A bore 55, considerably smaller in diameter than the expansion chamber, extends axially through one end portion of the shaft and connects with the expansion chamber through a flaring entrance passage 56, to provide for the admission of liquid refrigerant into the expansion chamber.

Liquid refrigerant is fed to the bore 55 from the high pressure portion of the system, by a duct 57. The inlet end of this duct is connected to the bottom of the trap 25 which is always full of liquid refrigerant, and its discharge end terminates in an expansion orifice 58. Since the pressure in the trap 25 is greater than the pressure in the expansion chamber, liquid refrigerant issues continually from the expansion orifice. The need for running clearance between the stationary duct 57 and the rotating shaft presents no sealing problem since, as shown in FIGURE 1, the entire discharge end portion of the supply duct 57 is, in effect, inside the motor enclosure. This follows from the fact that, as pointed out hereinbefore, the closed refrigerating system, including the pipe 16, can be said to constitute part of the motor enclosure. Where the duct 57 enters the pipe 16 there is, of course, no sealing problem since both are stationary.

The expanding gaseous refrigerant which leaves the expansion chamber 52 through the ports 54 and flows out through the radial passages 47 of the rotor, across the clearance between the rotor and stator, and through the radial passages 35 in the stator core, wipes across the conductor bars 49 and the field coils 37 or, in other words, across the hottest portions of the motor. Some of the gaseous refrigerant also flows out through the ends of the clearance between the stator and rotor to flow across the ends of the field coils, as indicated by the arrows in FIGURE 3. This flow of the gaseous refrigerant results not only from the natural expansion of the refrigerant, but is also promoted by the centrifugal action of the rotor, as the refrigerant leaves the expansion chamber.

Upon reaching the periphery of the stator core, the gaseous refrigerant is drawn off from the motor enclosure through a discharge port 64 which is connected by a duct 65 either with the pipe 16 as shown, or with the crossover duct 19. In either case, the gaseous refrigerant is returned to the refrigerating system at a point at which the refrigerant is in a gaseous state.

As will no doubt be readily appreciated, since the cooling medium—namely, the refrigerant taken from the closed refrigerating system is brought into the motor as a liquid—flashes into a gas as it moves out through the motor, full advantage is taken of the latent heat of vaporization.

Another very significant advantage of this invention is that it obviates the need for large piping or ducting to carry the cooling medium to and from the motor.

A structural detail which is considered important, concerns the specific formation of the spacers 36 which space the groups of stator laminations from one another. As shown in FIGURE 5, these spacers are metal bars disposed edgewise between the adjacent groups of laminations. At their medial portions they are bent so that the end portions of the bars are offset. This gives each spacer a desired edgewise stability and enables it to stand on edge without external support. This feature is particularly valuable in the larger diameters of the stator, but is not too important in the case of the rotor where the individual spacers 48 are simply straight bars disposed edgewise between adjacent laminations. In each instance the spacers are secured to one of the adjacent laminations—preferably by lugs 67 on one edge of the spacer, passing through appropriately located slots in the lamination to which it is to be secured and then swedged over. By assembling the spacers to one of the laminations in this manner, the stacking of the laminations during manufacture is facilitated.

From the foregoing description taken in connection with the accompanying drawings, it will be readily apparent to those skilled in this art that this invention provides a means for cooling electric motors which is especially well adapted to motors driving the compressors of refrigerating systems, since it utilizes liquid refrigerant, specifically liquid Freon as the cooling medium; and it will also be apparent that, by conducting the cooling medium into the very center of the machine as a liquid and allowing it to flash into a gas as it flows outwardly through strategically located passages, heat is rapidly carried away from the hottest parts of the machine to thereby achieve the optimum cooling effect in a way which in nowise interferes with the proper functioning of the motor and does not in anywise complicate the motor design.

It will also be understood that while the invention has been illustrated as applied to a motor driving a two-stage compressor, it is in nowise limited thereto, but is equally applicable to refrigerating systems having only single stage compressors.

What is claimed as my invention is:
1. In combination
   a totally enclosed electric motor having a housing, a stator, and a rotor;
   a closed circuit refrigeration system having a compressor driven by said electric motor to compress the refrigerant in the system, a condenser for condensing said compressed refrigerant from a gas to a liquid, having an inlet connected to said compressor and an outlet, and an evaporator connected to the outlet of said condenser for evaporating said liquid refrigerant and supplying the evaporated refrigerant to the compressor,
   means utilizing the refrigerant of said system to cool the motor comprising an expansion chamber in the interior of the rotor means providing passages leading from the expansion chamber radially out through the rotor and stator and opening to the interior of the housing, a supply duct leading from the outlet of the condenser to the expansion chamber inside the rotor, and an exhaust duct leading from the motor housing to the compressor, so that refrigerant is fed into the expansion chamber as a liquid, there flashes into a gas, and then after abstracting heat from the rotor and stator leaves the motor as a gas.

2. The combination of claim 1 wherein said evaporator has a float controlled valve for maintaining the level therein which provides a reservoir of compressed liquid in the outlet of said condenser to which said supply duct is connected.

References Cited by the Examiner

UNITED STATES PATENTS

| 714,881 | 12/02 | Emmet | 310—65 |
| 1,121,014 | 12/14 | Hobart | 310—52 |
| 1,779,797 | 10/30 | Baum | 310—54 |
| 1,913,138 | 6/33 | Apple | 310—65 |
| 2,249,882 | 7/41 | Buchanan | 310—58 X |
| 2,282,283 | 5/42 | Henter | 310—65 |
| 2,364,000 | 11/44 | Sawyer | 310—52 |
| 2,891,391 | 6/59 | Kocher | 62—475 |

FOREIGN PATENTS 727,761   4/55   Great Britain.

MILTON O. HIRSHFIELD, *Primary Examiner.*

DAVID X. SLINEY, *Examiner.*